United States Patent [19]

Jounela

[11] Patent Number: 5,385,600
[45] Date of Patent: Jan. 31, 1995

[54] METHOD FOR BENEFICIATING NICKEL SULFIDE CONCENTRATES AND CORRESPONDING MIXTURES, UNSUITABLE FOR SMELTING

[75] Inventor: Seppo S. Jounela, Espoo, Finland

[73] Assignee: Outokumpu Harjavalta Metals Oy, Harjavalta, Finland

[21] Appl. No.: 76,248

[22] Filed: Jun. 11, 1993

[30] Foreign Application Priority Data

Jun. 18, 1992 [FI] Finland .................................. 922844

[51] Int. Cl.$^6$ ...................... C22B 23/00; C22B 23/02
[52] U.S. Cl. .................................... 75/430; 75/629; 75/743; 209/164; 423/150.1
[58] Field of Search ................... 75/629, 430, 743; 423/150.1; 209/164

[56] References Cited

U.S. PATENT DOCUMENTS

| | | | |
|---|---|---|---|
| 2,556,215 | 6/1951 | Queneau et al. | 423/150.1 |
| 2,668,107 | 2/1954 | Gordon et al. | 75/629 |

*Primary Examiner*—Melvyn J. Andrews
*Attorney, Agent, or Firm*—McAulay Fisher Nissen Goldberg & Kiel

[57] ABSTRACT

The invention relates to a method for fully beneficating nickel sulfide concentrates or other corresponding mixtures, unsuitable for smelting, by combining the use of both pyrometallurgical and hydrometallurgical processes, so that there are formed two separate concentrates, the first of which is suited to pyrometallurgical and the second to hydrometallurgical treatment. In the concentrate going to pyrometallurgical processing, the valuable metal content increases as a consequence of the treatment, and the Fe/MgO ratio of this concentrate is at least 2.6.

7 Claims, No Drawings

METHOD FOR BENEFICIATING NICKEL SULFIDE CONCENTRATES AND CORRESPONDING MIXTURES, UNSUITABLE FOR SMELTING

The present invention relates to a method for fully beneficiating nickel sulfide concentrates and corresponding mixtures unsuitable for smelting by combining the use of both pyrometallurgical and hydrometallurgical processes, so that there are formed two concentrates, the first of which is suited to pyrometallurgical and the second to hydrometallurgical treatment.

The amount of such nickel mineralizations that are easily concentrated or processed metallurgically, particularly pyrometallurgically is decreasing throughout the world. Therefore more and more low-quality mineralizations, as for the said features, must be taken into use. In addition to this, several mineralizations are located in areas that are either totally without water or where the water is saline and has a high halogen content.

The problems is concentration caused by difficult gangue minerals for the quality of the concentrates are related to the properties of the minerals. Gangue minerals often consist of silicates that are difficult to be treated from the process metallurgical point of view. The geometrically complicated features of gangue minirals consist of many phases containing, in addition to $SiO_2$, variable amounts of different iron, aluminium, manganese and magnesium compounds, which again are accompanied by a large group of oxides (often magnetite $Fe_3O_4$), hydroxides, carbonates and sulfates. Various magnesium silicates have proved to be particularly difficult with respect to process metallurgy.

Minerals are often very soft, electrically strongly charged and particularly easily concentrated together with valuable minerals, owing to textural features and mixed grains with valuable minerals. For this kind of raw materials, there has not been found conditions where good-quality concentrates for pyrometallurgical processing could be obtained, even if a sufficiently high recovery should be achieved. Intensive flocculation and adsorption with valuable minerals are typical of these minerals, both with dry and wet processing. Moreover, these types of gangues have remarkably high specific areas and often a very high solubility, too.

From mineralizations that are difficult to be concentrated, there are obtained large amounts of concentrates with unsatisfactory qualities to metallurgical further processing. These concentrates have too high magnesium oxide contents, particularly owing to high magnesium oxide contents of the gangue, high halogen contents or too low iron contents. Above all the iron/magnesium oxide ratio often is low, because the concentrates contain very little iron sulfides, such as pyrrhotite $Fe_{1-x}S$. Such mineralizations often contain magnetite, sometimes high quantities. At the concentration stage, into the concentrate there are obtained mixed valuable metal—magnetite grains, and the iron content of the concentrate often consists to a remarkable degree of the magnetite of these grains. This leads to difficulties in the pyrometallurgical treatment, for if the MgO content of the slag created in the smelting is over 11%, the viscosity of the slag rises so high that it makes it difficult to remove the slag from the furnace.

In areas, where fresh water is not available, saline ground water must often be used in connection with wet concentration, and this contains high quantities of dissolved salts, particularly chlorine and fluorine. Their content in the concentrate is attempted to be decreased by subjecting the concentrates to several successive cleaning and washing stages. Halogens cause significant corrosion damages particularly to the equipment after the furnaces.

The concentration of ores is generally carried out by known concentration methods, by using either dry or wet processes. Normally by this procedure, with mineralogically distinctive ores, after a number of cleaning stages, concentrates well suited for smelting, are obtained. With high-grade and/or mineralogically good-quality ores we here refer to ores that essentially do not contain, or contain to a slight extent only, problematic gangue minerals, particularly magnesium silicates, hydroxides and/or hydroxyhalides. With these concentrates, the iron/magnesium oxide ratio does not cause problems.

When the valuable minerals of an ore deposit are present in finely disseminated and intergrown form, it often is very difficult to achieve a good concentrate quality with an economically satisfactory recovery. In order to obtain good (high-grade) concentrate the degree of liberation of minerals after grinding must be high, which often requires a very fine grind. However, the concentrate is often suitable for smelting if the ore deposit contains other sulfidic minerals rich in iron, such as pyrrhotite, and if also these other sulfidic minerals are recovered into the concentrate. The nature of silicates contained in an ore deposit may also be such that they are not easily recovered into a concentrate, or that they can be depressed at the cleaning stages.

When an ore deposit contains silicates that are easily concentrated into the concentrate, particularly magnesium silicates, such as talc and serpentinite minerals, it often is very difficult to obtain concentrates a sufficient quality for pyrometallurgical treatment, i.e. concentrates with a sufficiently low MgO content. Various type silicates may arise similar problems, too, with volcanitic ores (Kambalda, Australia).

The present invention relates to a method for economically and technically utilizing a concentrate that is otherwise unsuitable or poorly suited for smelting, to the full extent by separating it into two separate concentrates by means of a process suited for this purpose. The separation of the concentrate can be carried out by means or either wet of dry concentration.

The employed wet concentration method can be for instance a thorough selective flotation, constituting several intermediate product grindings and classifications as well as cleaning stages. Possible dry methods are for instance various grinding and classification methods and magnetic separations often connected thereto, as well as various methods based on specific weight and electrostatic methods. The employed grinding methods may be grinding in a ball mill or a vibrating mill, or jet mill grinding. In the treatment of the said complicated materials there is now found a narrow particle size region and conditions which can be utilized in order to make processing possible. The essential novel features of the invention are apparent from the appended patent claims.

First there is formed a concentrate where the amount of harmful gangue minerals and particularly harmful magnesium silicates is so low, that the concentrate is suited to pyrometallurgical treatment. Now the iron/magnesium oxide ratio of the produced concentrate is higher than 2.6, and its valuable metal content is distinctly higher than with the second concentrate produced in the method. The limit of the said Fe/MgO ratio is the lower limit of the pyrometallurgically treatable concentrate; obviously the higher the ratio, the better the prospects for processing.

The iron/magnesium oxide ratio of the concentrate can also be defined so that the MgO content of the slag produced in the pyrometallurgical treatment must be below 11%. If the MgO content of the slag is higher, also the viscosity of the slag is so high that it is difficult to be removed from the furnace at the same temperature where the pyrometallurgical treatment of nickel otherwise is normally carried out. A raise in the temperature improves the fluidity of the slag, but it is not technically and economically beneficial. The nickel concentrate produced according to this method is advantageously treated in a flash smelting furnace.

The second concentrate to be produced has a lower valuable metal content than the one described above, and it contains more gangue minerals and silicates that are specially harmful with respect to smelting, such as magnesium silicate. It turns out that the obtained concentrate, which is poorer in valuable metal content, can be treated hydrometallugically, and an economically profitable process can be achieved.

By concentrating the finely separated silicate material contained in the original composite concentrate to a significant degree into the concentrate going to hydrometallurgical treatment, it is possible to produce a concentrate which is suitable to pyrometallurgical smelting, has a higher valuable metal content and a lower content of magnesium silicates that are harmful for the smelting of the concentrate.

Owing to finely separated silicate impurities, the concentrate going to hydrometallurgical processing has a significantly finer particle size than the coarser pyrometallurgical concentrate. However, the fine particle size distribution is an advantage with respect to hydrometallurgical leaching. A significant proportion of the halogen also goes to the hydrometallurgically treatable concentrate, which is advantageous for the pyrometallurgical processing.

The concentrate that is prepared for hydrometallurgical treatment and has a high MgO content, is first conducted into pressure leaching carried out with oxygen. In the leaching the valuable metals nickel, cobalt and copper are leached into sulfate form, and the iron is precipitated. The sulfate solution is cleaned for instance by means of suitable extraction stages. When the valuable metals other than nickel are removed from the solution, the recovery of nickel from the solution can be carried out either electrolytically or by reduction.

The invention is further explained with reference to the appended examples, the first of which described dry concentration and the second wet concentration.

EXAMPLE 1

In the experiments that were carried out, there were treated nickel concentrates of the serpentinite and pyroaurate type containing magnesium silicates, which concentrates were extremely difficult to concentrate, soft, electrically charged and with a high specific area. The object was to achieve, according to the invention, two separate concentrates, the first of which is suited to pyrometallurgical and the second to hydrometallurgical treatment.

The initial treatment of nickel ore was carried out in conventional fashion, by using thorough selective flotation, so that in addition to the sougherflotation, there are performed several cleaning flotations with depressant chemicals. The object was to decrease, with conventional methods, the amount of the magnesium silicates and halogens easily flotated into the concentrate to be as low as possible. The analysis of the obtained concentrate is given in the appended Table 1. In order to improve the quality, the concentrate was subjected to washing and filtration.

The table shows the amount of components, also after the washing.

TABLE 1

| Component | Concentrate analysis | |
|---|---|---|
| | Quantity before washing % by weight | Quantity after washing % by weight |
| Ni | 18.2 | 15.8 |
| Fe | 30.5 | 28.5 |
| MgO | 8.9 | 7.1 |
| Fe/MgO | 3.43 | 4.01 |
| S | 29.3 | 26.5 |
| $SiO_2$ | 6.7 | 6.5 |
| F | 11.3 | 20.4 |
| Cl | 0.56 | 0.12 |

The analysis describing the quality of the concentrate shows that during the washing and filtration, the valuable metal content decreased, as did the iron content and MgO content. The Fe/MgO ratio rose higher, and consequently the pyrometallurgical processing chracteristics of the concentrate was improved after the washing. Among the halogens, chlorine was distinctly cleared of the concentrate, which is advantageous for the pyrometallurgical treatment.

The washed and filtered concentrate was further treated by separating it into two separate concentrates. The separation was carried out by grinding and classification with an Alpine jet mill. The obtained products were a clearly coarser product (PY), which is suitable for pyrometallurgical treatment because it has a sufficiently high Fe/MgO ratio, and because its valuable metal content is higher than that of the second, concentrate (HY) the particle distribution of which is finer. Table 2 shows that the coarser product is for all respects more suitable for pyrometallurgical concentration than the original concentrate represented in Table 1. The contents are given in percentages by weight. Table 3 shows the fineness of the same products.

The tables below show that both of these products (concentrates), obtained from the original concentrate, can be utilized in a technically and economically sensible way. In addition to this, Table 2 shows (in percentages of quantity) that the proportion of the coarser product (PY) and finer product (HY) can be easily adapted, for instance according to the requirements of the pyrometallurgical treatment in question. Thus the proportions of the new products obtained from the original concentrate can also be defined in a desired fashion.

The decrease in the content of silicates, calculated as $SiO_2$ content, is unfavourable with respect to pyrometallurgical processing of the product, but the addition of silicates into the pyrometallurgical process is easy, because it can be carried out as a sand addition. On the other hand it is pointed out that when the amount of silicates in a pyrometallurgical product is decreased, the amount of soft magnesium silicates, and particularly magnesium, also is decreased.

TABLE 2

| | Test | | | | | | | | | | | |
|---|---|---|---|---|---|---|---|---|---|---|---|---|
| | 1 | | 2 | | 3 | | 4 | | 5 | | 6 | |
| | HY | PY | HY | PY | HY | PY | HY | PY | HY | PY | HY | PY |
| % of quantity | 59.6 | 40.4 | 45.4 | 54.6 | 34.7 | 65.3 | 31.9 | 68.1 | 20.3 | 79.7 | 12.8 | 87.2 |
| Ni | | | | | | | | | | | | |
| % of content | 14.6 | 15.0 | 14.5 | 15.3 | 13.8 | 15.5 | 13.8 | 15.3 | 12.9 | 15.4 | 11.6 | 15.4 |
| % of recovery | 58.9 | 41.1 | 44.0 | 56.0 | 32.1 | 67.9 | 29.7 | 70.3 | 17.6 | 82.4 | 10.0 | 90.0 |
| MgO | | | | | | | | | | | | |
| % of content | 6.8 | 6.3 | 7.1 | 6.1 | 7.3 | 6.1 | 7.5 | 6.0 | 8.3 | 5.9 | 8.7 | 6.2 |
| % of recovery | 61.4 | 38.6 | 49.2 | 50.8 | 38.9 | 61.1 | 36.9 | 63.1 | 26.4 | 73.6 | 17.1 | 82.9 |
| Fe | | | | | | | | | | | | |
| % of content | 24.0 | 25.9 | 24.2 | 27.0 | 23.1 | 26.9 | 23.0 | 27.3 | 20.5 | 26.7 | 19.3 | 26.3 |
| % of recovery | 57.7 | 42.3 | 42.7 | 57.3 | 31.4 | 68.6 | 28.3 | 71.7 | 16.4 | 83.6 | 9.8 | 90.2 |
| Fe/MgO | 3.53 | 4.11 | 3.41 | 4.43 | 3.16 | 4.41 | 3.06 | 4.55 | 2.47 | 4.53 | 2.22 | 4.24 |
| $SiO_2$ | | | | | | | | | | | | |
| % of content | 6.2 | 5.7 | 6.3 | 5.5 | 6.6 | 5.7 | 6.6 | 5.6 | 6.9 | 5.8 | 7.2 | 5.7 |
| % of recovery | 61.6 | 38.4 | 48.8 | 51.2 | 38.1 | 61.9 | 35.5 | 64.5 | 23.3 | 76.7 | 15.7 | 84.3 |
| S | | | | | | | | | | | | |
| % of content | 22.0 | 24.8 | 22.2 | 25.2 | 22.2 | 25.7 | 21.1 | 25.2 | 19.5 | 26.1 | 18.6 | 25.3 |
| % of recovery | 56.7 | 43.3 | 42.3 | 57.7 | 31.5 | 68.5 | 28.1 | 71.9 | 16.0 | 84.0 | 9.8 | 90.2 |
| Cl | | | | | | | | | | | | |
| % of content | 0.083 | 0.083 | 0.1 | 0.082 | 0.11 | 0.083 | 0.13 | 0.083 | 0.14 | 0.084 | 0.16 | 0.086 |
| % of recovery | 59.6 | 40.4 | 50.3 | 49.7 | 41.4 | 58.6 | 42.3 | 57.7 | 29.8 | 70.2 | 21.5 | 78.5 |
| F | | | | | | | | | | | | |
| Content - ppm | 30.5 | 30.0 | 27.0 | 23.0 | 22.0 | 22.0 | 21.5 | 27.0 | 21.5 | 20.5 | 34.5 | 36.5 |
| % of recovery | 60.0 | 40.0 | 49.4 | 50.6 | 34.7 | 65.3 | 27.1 | 72.7 | 21.1 | 78.9 | 12.4 | 87.6 |
| Specific area $m^2/g$ | 1.50 | 0.97 | 1.44 | 0.96 | 1.73 | 0.93 | 1.70 | 1.04 | 1.82 | 0.88 | 2.08 | 0.99 |

HY = product for hydrometallurgical treatment
PY = product for pyrometallurgical treatment

TABLE 3

| | Results for fineness | | | | | | | | | | | |
|---|---|---|---|---|---|---|---|---|---|---|---|---|
| Test | 1 | | 2 | | 3 | | 4 | | 5 | | 6 | |
| Fineness (μm) | HY | PY | HY | PY | HY | PY | HY | PY | HY | PY | HY | PY |
| d10 | 2.52 | 5.03 | 1.85 | 5.20 | 1.28 | 6.38 | 1.22 | 7.15 | 0.97 | 6.86 | 0.87 | 6.11 |
| d50 | 14.02 | 20.21 | 10.94 | 21.44 | 7.83 | 22.25 | 7.09 | 21.56 | 4.54 | 20.40 | 3.48 | 19.21 |
| d90 | 33.00 | 38.59 | 28.89 | 38.18 | 21.42 | 41.70 | 21.75 | 40.90 | 11.75 | 39.25 | 10.34 | 38.38 | dx = x (μm) passing percentage
d10 = 10% of the particles have a diameter smaller than the given μm-value
d50 = 50% of the particles have a diameter smaller than the given μm-value
d90 = 90% of the particles have a diameter smaller than the given μm-value In the above tables it is clearly seen that when the proportion of the finer product for hydrometallurgical treatment is decreased, its valuable metal content (Ni) also is decreased, as well as its iron and sulfur content. The magnesium oxide (MgO), silicon acid and chlorine contents increase and the sulfur content is decreased. It is further seen from the table that the specific area increases and fineness decreases. The decrease in fineness is due to the changes of the material proportions between the hydrometallurgical and pyrometallurgical product. In the classification, the quantity of the product for pyrometallurgical treatment increases, and at the same time some fine material is transferred into this section.

The coarse product for pyrometallurgical treatment behaves in an opposite fashion. The Fe/MgO ratio that is essentially important for the pyrometallurgical treatment is consistently decreased as for the hydrometallurgically treatable product, and increased as for the pyrometallurgically treatable coarser product. Thus the choice between the two process metallurgical alternatives for the concentrate is simple and depends on the requirements set for the metallurgical treatment in question.

EXAMPLE 2

The example describes how the concentrate is separated for pyrometallurgical and hydrometallurgical treatment by means of wet concentration.

The washed and filtered concentrate (Table 1) was treated further by separating it into two separate concentrates. The separation was carried out by means of intensively magnetic Carpco separation. The concentrate was elutriated into water and dispersed with sodium silicate ($Na_2SiO_3$) or water-glass at a rate of 2.2 kg/h. The used matrix was a Jones Matrix with an aperture of 1.5 mm. The employed currents were 0.6 A, 1.2 A, 3.5 A and 5.6 A. The results are given in Table 4.

TABLE 4

| Fraction Current | M1 0.6 A | M2 1.2 A | M3 3.5 A | M4 5.6 A | EM |
|---|---|---|---|---|---|
| % of quantity | 35.9 | 12.3 | 13.3 | 5.8 | 32.8 |
| Cumulative % of quantity | — | 48.2 | 61.5 | 67.3 | 100 |
| NI | | | | | |
| % of content | 13.4 | 17.7 | 20.2 | 21.5 | 14.4 |
| Cumulative % of content | — | 14.5 | 15.7 | 16.2 | 15.6 |
| % of recovery | 30.8 | 14.0 | 17.2 | 8.0 | 30.1 |
| Cumulative 5 of recovery | — | 44.7 | 61.9 | 69.9 | 100 |
| MgO | | | | | |

TABLE 4-continued

| Fraction Current | M1 0.6 A | M2 1.2 A | M3 3.5 A | M4 5.6 A | EM |
|---|---|---|---|---|---|
| % of content | 4.6 | 5.2 | 6.2 | 8.8 | 8.8 |
| Cumulative % of content | — | 4.7 | 4.9 | 5.0 | 6.2 |
| % of recovery | 26.5 | 10.2 | 11.5 | 5.7 | 46.0 |
| Cumulative % of recovery | — | 36.7 | 48.3 | 54.0 | 100 |
| Fe | | | | | |
| % of content | 37.3 | 30.8 | 29.7 | 27.9 | 26.9 |
| Cumulative % of content | — | 35.6 | 34.4 | 33.8 | 31.5 |
| % of recovery | 42.4 | 12.0 | 12.5 | 5.1 | 27.8 |
| Cumulative % of recovery | — | 54.5 | 67.0 | 72.1 | 100 |
| Fe/MgO | | | | | |
| Fe/MgO | 8.11 | 5.92 | 4.79 | 3.17 | 3.06 |
| Fe/MgO, cumulative | — | 7.57 | 7.02 | 6.76 | 5.08 |
| $Fe_3O_4$ | | | | | |
| % of content | 17.3 | 2.8 | 1.6 | 1.4 | 1.3 |
| Cumulative % of content | — | 13.6 | 11.0 | 10.2 | 7.2 |
| % of recovery | 85.4 | 4.7 | 2.9 | 1.1 | 5.8 |
| Cumulative % of recovery | — | 90.1 | 93.0 | 94.2 | 100 |

M1 ... M4 = magnetic fractions
EM = non-magnetic fraction

The $Fe_3O_4$ content (magnetite) describes the amount of ferromagnetic material in the sample, defined by a Satmagan-analyzer (Saturation Magnetization Analyzer).

Along with the increase of current strength, the proportion of magnetic material increases; the valuable metal content (Ni) and its recovery to magnetic fractions also increase in a cumulative fashion. The magnesium oxide content (MgO) increases slightly along with an increase in the strength of the magnetic field, but it remains clearly below the content of the non-magnetic fraction. Iron is cumulated in intensively magnetic fractions. The iron/magnesium oxide ratio is naturally decreased when the quantity of magnetically separated material increases, but the difference to the non-magnetic fraction is clear. The value of the cumulative ratio is 6.76, which with the non-magnetic fraction corresponds to 3.06. The magnetite content ($Fe_3O_4$) distinctly shows that almost all of the ferromagnetic material is transferred to the magnetic fractions.

I claim:

1. A method for fully beneficiating nickel sulfide concentrates containing at least Fe and MgO and valuable metals, comprising the steps of:
   separating nickel sulfide concentrates by concentrating into two separate concentrates, a first of which concentrates is suited to a pyrometallurgical treatment and a second of which concentrates is suited to an hydrometallurgical treatment so that a Fe/MgO ratio of the pyrometallurgical treatable concentrate which contains a higher valuable metal content than the hydrometallurgically treatable concentrate is adjusted to be at least 2.6; and
   treating hydrometallurgically the concentrate which contains a lower valuable metal content but a higher MgO content than the pyrometallurgically treatable concentrate.

2. The method according to claim 1, including the step of:
   wet concentrating the nickel concentrates for separation into the two concentrates.

3. The method according to claim 1, including the step of:
   dry concentrating the nickel concentrates for separation into the two concentrates.

4. The method according to claim 1, including providing halogens during the step of concentrating the nickel concentrates and concentrating halogens into the hydrometallurgically treatable concentrate.

5. The method according to claim 1, including treating the pyrometallurgical treating concentrate pyrometallurgically and forming a slag containing MgO which is not over 11%.

6. The method according to claim 2, including providing halogens during the step of concentrating the nickel concentrates and concentrating halogens into the hydrometallurgically treatable concentrate.

7. The method according to claim 3, including providing halogens during the step of concentrating the nickel concentrates and concentrating halogens into the hydrometallurgically treatable concentrate.

* * * * *